Sept. 6, 1960  B. N. HOFFSTROM  2,951,713
COUPLINGS

Filed March 12, 1956  7 Sheets-Sheet 1

INVENTOR
Bo Nilsson Hoffstrom

BY Strauch, Nolan & Neale

ATTORNEYS

Sept. 6, 1960  B. N. HOFFSTROM  2,951,713
COUPLINGS

Filed March 12, 1956  7 Sheets-Sheet 2

INVENTOR
BO NILSSON HOFFSTROM

BY

ATTORNEYS

Sept. 6, 1960     B. N. HOFFSTROM     2,951,713
COUPLINGS Filed March 12, 1956     7 Sheets-Sheet 7

INVENTOR
Bo Nilsson Hoffstrom

BY Strauch, Nolan & Neale

ATTORNEYS

United States Patent Office 2,951,713
Patented Sept. 6, 1960

2,951,713

COUPLINGS

Bo Nilsson Hoffstrom, New York, N.Y.
(13003 Montana Ave., Los Angeles 49, Calif.)

Filed Mar. 12, 1956, Ser. No. 570,813

16 Claims. (Cl. 284—19)

This invention relates to coupling devices and more particularly to such devices of the so-called "quick disconnect" type.

This invention in certain aspects is particularly suitable for coupling fluid lines and in one form provides a coupling in which the lines are automatically sealed against fluid flow when separated. However certain other aspects of the invention are of broader application and may be utilized effectively in connecting electrical lines in electrical wall sockets or in any environment where it is desired to effect a rigid quickly disconnectable coupling between two members. For present purposes the invention will be disclosed as applied to quick disconnect self-sealing couplings since it is in such devices that certain advantages of the invention are realized most fully.

Quick disconnect self-sealing couplings particularly those suitable for military use must satisfy a number of exacting standards. The many prior attempts to provide couplings satisfying these requirements as well as commercial requirements as indicated by the number of prior patents relating to these couplings have been at best only partially successful.

Generally the prior couplings have been difficult to manipulate manually, have failed to provide adequate safeguards against accidental uncoupling or have been unduly complex and bulky. Also the sealing devices in prior couplings have been characterized by limited service life particularly when the couplings are utilized with such fluids as kerosene which are notoriously difficult to seal.

It is accordingly the primary purpose and object of the present invention to provide improved coupling devices and particularly quick disconnect self-sealing coupling devices which overcome the above-stated objections to prior couplings.

In its broader aspects the invention comprises plug and socket members of novel construction which may be quickly connected and disconnected and which are positively held in coupled relation by a unique latch construction including latch fingers and an actuating sleeve on the socket member. The novel latch construction permits the coupling of the parts by moving the parts longitudinally into coupling position without the use of special tools and without the preparation or manual prepositioning of the latch mechanisms of either of the parts since the component parts of the latch mechanism are spring biased to a normal position which assures positive latching of the parts. The plug and socket members may be separated by direct longitudinal pull on either of them.

Many advantages of the novel latch mechanism are best realized when the actuating sleeve of the socket member is mounted in a fixed position, for example, in the wall of a building, the wall of a tank, or, in aircraft, in the instrument panel or fire wall. When the socket is so mounted the plug may be positively latched to the coupling by simply inserting the plug into the socket under manual pressure and the plug may be removed merely by pulling it away from the socket member. However despite the ease of which the parts may be coupled and uncoupled the construction of the latch mechanism is such that the parts cannot be uncoupled by the application of internal pressures without destruction of the latch mechanism or the coupling members.

In the preferred form of the invention the plug and socket members each include normally closed valve elements which are opened automatically when the plug and socket members are coupled together. The construction of the valve components is such that substantially full surface metal to metal contact is achieved during the coupling action before the valves are opened to assure minimum air inclusion when the parts are connected and minimum fluid loss when the parts are disconnected. In the preferred form of the invention the coupling is of the breakaway type, which can be reconnected with a straight longitudinal insertion of the plug member into the socket to provide an action which is of particular interest for drop tank installations and underwing refueling, the flush mounted socket providing a clean aerodynamic surface which is fully accessible.

The novel couplings of the present invention also include as an important feature an improved sealing construction which in one form utilizes conventional O-rings in a novel manner to provide positive seals while minimizing sliding friction and substantially precluding the possibility of damage to the O-ring seals under high applied pressures. Because of the unique construction of the various seals the quick disconnect couplings of the present invention can be used to connect fluid lines handling fuel, oil, hydraulic fluid, water or for air and most other gases. Since the seals are equally effective whether dry or lubricated the couplings are particularly suitable for coupling kerosene or oxygen lines.

It is another feature of the invention that both audible and visual signals are provided to indicate positive latching of the plug and socket members. Specifically the construction of the latching members is such that a clearly audible click is produced when the plug and socket members reach fully coupled position. Also the construction of the latching mechanism is such that the parts are fully coupled only when the above-mentioned actuating sleeve occupies a single predetermined position, and suitable indicia are provided on the external surface of the plug member to indicate when the actuating sleeve is in the desired position.

In accordance with another feature of the invention the plug and socket members are so constructed as to provide a self-sealing quick disconnect coupling under high applied external pressures such as may be encountered, for example, in underwater operations.

In all forms of the invention the couplings are characterized by relative light weight and compact construction particularly as compared with comparable prior units.

Further, all forms of the present invention can be maintained and assembled or disassembled without special tools. For example, all forms of the invention can be completely disassembled with only a vise or heavy pliers, a wrench of standard construction and a small screwdriver.

It is another feature of the invention that all forms of the coupling with slight modification lend themselves readily to remote control to permit automatic or manual disconnection of the coupling members from a point removed any convenient distance from the coupling members.

Other features, objects and advantages of the invention will become apparent as the description proceeds in connection with the accompanying drawings in which.

Figure 1:
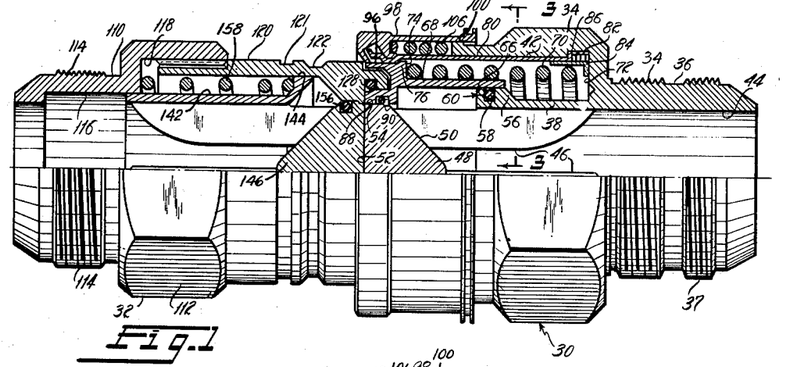
Figure 1 is a view partly in section and partly in elevation illustrating one form of the self-sealing quick disconnect coupling constructed in accordance with the present invention showing the plug and socket members in position for coupling.
Figures 2, 3, 4, 6:
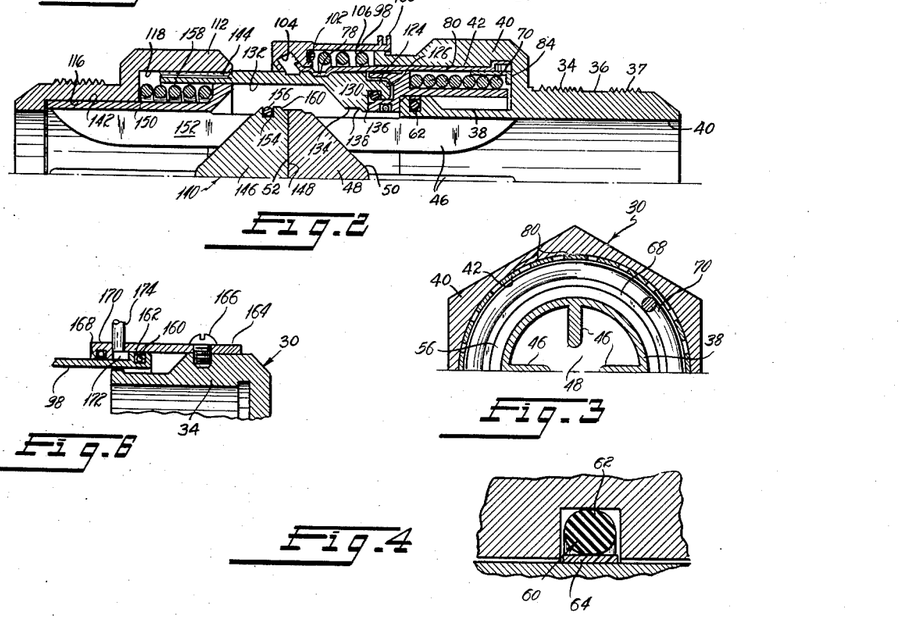
Figure 2 is a longitudinal half section of the unit of Figure 1 showing the plug and socket members in coupled relation.
Figure 3 is an enlarged fragmentary section taken along line 3—3 of Figure 1 illustrating the construction of a portion of the latch mechanism.
Figure 4 is a similar view of a sliding seal incorporated in the coupling of Figure 1.
Figure 6 is an enlarged fragmentary view of a modification which may be incorporated in the unit of Figures 1 and 2 to provide for remote control of the latter.

Referring now more particularly to the drawings, the coupling shown in Figures 1 and 2 comprises a valved socket member, indicated generally at 30, and a valved plug member, indicated generally at 32, the parts being shown in Figure 1 at the moment when the contacting portions of the plug and socket are initially brought into contact and before the parts are coupled.

The socket element 30 comprises a main body member 34 preferably of one piece construction. Projecting from one end of the body member 34 is an attaching section 36 provided with suitable external threads 37 for attachment to a standard fitting of a fluid line. Extending axially oppositely from the attaching section 36 are inner and outer annular sleeve sections 38 and 40. The outer sleeve 40 is machined in a form of a hex-nut on its outer surface and is provided with a substantially cylindrical inner surface 42. The attaching section 36 and the sleeve 38 are provided with a circular through bore 44 of uniform diameter forming a continuous fluid passage through said socket. At spaced points around the inner periphery of the sleeve section 38, preferably at 90° intervals, integral inwardly projecting ribs 46 are provided which extend inwardly and forwardly of the sleeve section 38 and at their forward ends are formed integrally with a fixed valve seat element 48 having an inwardly facing conical surface 50, an outer planar surface 52 and a cylindrical peripheral surface 54. The ribs 46, which are preferably of streamlined section, are smoothly curved at their inner ends to reduce impedance to flow.

An outwardly projecting boss 56 is provided adjacent the outer end of the sleeve 38 and is formed with an outwardly opening annular groove 58 in which an O-ring sealing assembly 60 is received. Sealing assembly 60 is preferably of the type shown on enlarged scale in Figure 4 and comprises an O-ring 62 and a sole ring element 64 preferably of Teflon or like material having a low coefficient of friction. This sealing construction provides a low friction seal while retaining the full efficiency of the O-ring 62. At opposite sides of the groove 58 the boss 56 is provided with peripheral finished cylindrical surfaces 66 which slidably support a sleeve valve member 68 which is received in the annular space between the inner and outer sleeves 38 and 40.

A coil spring 70 is compressed between wall 72 of the body member 34 and a radial shoulder 74 on the sleeve valve 68 to bias the latter outwardly or to the left as viewed in Figure 1. Outward movement of the valve sleeve 68 is limited by an outwardly projecting annular shoulder 76 which abuts against an inwardly projecting indentation 78 formed in each of a plurality of spring latch fingers 80. The latter which are formed of metal are arranged in circumferentially spaced relation within the cylindrical bore of the outer sleeve section 40 and are provided with outwardly bent portions 82 at their inner ends which are lockingly held by a sleeve 84 in a recess 86 in the body member 34 formed at the juncture of the bore 42 and the wall 72. The outer end of the valve sleeve 68 is provided with a cylindrical bore 88 in which an inwardly opening annular groove 90 for a rubber O-ring 92 is formed as shown on enlarged scale in Figure 5. The bore 88 of the sleeve valve 68, which encircles the cylindrical surface 54 of the valve seat member 48 in close clearance relation is relieved adjacent its inner end as at 94. In practice the parts are so proportioned that the surface 54 contacts the inner surface of the O-ring 92, just before the sleeve valve 68 reaches its limit position, as shown in the figures. Accordingly a make and break seal is established which involves substantially no sliding action consequently reducing the frictional resistance to travel of the sleeve valve 68 and substantially eliminating possibility of damage to the O-ring 92.

Figure 5:
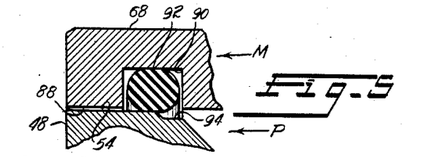
Figure 5 is an enlarged fragmentary section showing a typical make and break seal of the coupling of Figure 1.

In Figure 5 the arrow P indicates the direction of application of the fluid pressure and the arrow M indicates the direction of motion of the part carrying the O-ring as it is moved into sealing position. It is an important feature of this sealing construction in all applications discussed below as well as the particular application of Figure 5 that the part carrying the O-ring is moved into sealing position in the direction of applied pressure and moved away from sealing position in a direction opposite to the applied pressure. Only in this manner can the desired sealing action and the required mechanical support for the O-ring be obtained.

An outer cylindrical surface 96 on the valve sleeve 68 effectively supports the indentations 78 of the locking spring fingers 80 against radially inward movement.

Thus the valve sleeve 68 as well as the equivalent members in the modified forms of the invention discussed below may be termed an annular support member. An annular latch ring 98, mounted for limited axial sliding movement on a cylindrical shoulder 100 formed adjacent the free end of the sleeve section 40 of the body 34 is provided with an inwardly facing annular cylindrical shoulder 102 which engages the outer surface of the indentations 78 of the spring fingers 80 when the parts are in relative positions shown in Figure 1. Accordingly when the plug and socket members are uncoupled the spring fingers 80 are fully supported against inward and outward radial movement to prevent damage to the spring fingers.

The outer end of the latch ring 98 is provided with an inwardly facing annular recess 104 which receives the free ends of the latch spring fingers 80. A coil spring 106 compressed between the end of the sleeve section and a radial wall of the latch ring 98 biases the latter outwardly or to the left as viewed in Figure 1, movement of the latch ring 98 in this direction being prevented when the parts are uncoupled by contact of the shoulder 102 and the indentations 78.

Preferably, the portion of the latch ring 98 which slidably engages the socket body and the inner and outer surfaces of the free ends of the fingers 80 is coated with molybdenum disulphide or similar material to promote free sliding movement of the parts. Corresponding parts of the modified forms of the invention discussed below are similarly lubricated.

The plug member 32 includes a main body member 110 provided on its outer surface with a hex configuration, indicated generally at 112, and screw threads 114 for attachment to a standard fluid line fitting. The inner surface of the body member 110 is formed by stepped bores 116 and 118 the outer end of the latter being threaded to receive an annular extension 120. The outer surface of the member 120 is substantially cylindrical except where it is interrupted by an annular groove 121 and an annular locking notch 122 which is provided with a flat central portion and tapered side walls conforming substantially exactly to the conformation of the locking indentations 78 on the latch fingers 80. At its free end the member 120 is provided with an annular lip 124 which as shown in the figures is adapted to be received within an annular groove 126 formed in the end of the sleeve valve 68. An annular inwardly directed groove 128 is formed in the lip or extension 124 and carries an O-ring 130 which engages a wall of the recess 126. This engagement is established when the parts are brought into the position shown in Figure 1 and is maintained when the parts are coupled. The inner wall of the recess 126 is relieved to provide a make and break seal of the type discussed in connection with Figure 5.

The inner surface of the member 120 is formed by successive stepped cylindrical bores 132, 134 and 136, the latter two bores being joined by an inclined shoulder 138. An annular valve member indicated generally at 140 is mounted for sliding movement within the plug 32 on cylindrical surfaces 142 and 144 which slidably engage the respective bores 116 and 132 in the body member 110 and the extension 120. A valve member 146 having a planar end face 148 is integrally joined to the sleeve section 150 by means of a plurality, preferably four of radially extending ribs 152 of the same general construction as the ribs 46. An outwardly opening peripheral groove 154 carrying an O-ring 156 is formed in the valve member 146 for sealing engagement with the bore 134 of the member 120 when the parts are uncoupled as shown in Figure 1. The valve member 146 is biased into this position by a coil spring 158, a stop shoulder 160 on the valve member contacting the shoulder 138 on the member 120 to limit movement of the member 146 in the spring biased direction. It will be noted that the length of bore 134 is such that the surface of bore 134 contacts the O-ring 156 only when the member 146 reaches its limit position so that a make and break seal of the type discussed in connection with Figure 5 is formed between the O-ring 156 and the surface of bore 134.

Assuming the plug and socket members 30 and 32 are connected to lines carrying fluid under pressure and the parts are uncoupled, the sleeve valve 68 in the socket member will be urged toward closed position by a force equal to the force exerted by the coil spring 70 plus the line pressure multiplied by the annular area between the two sealing points at the O-rings 60 and 92. The valve member 146 in the plug assembly 32 will be biased toward closed position as shown in Figure 1 by the combined forces exerted by the spring 158 and the line pressure applied to the circular area bounded by the O-ring 156.

Accordingly it will be seen that in each case the sealing force is a function of the internal line pressure. The seals in both the plug and socket members are so constructed that they provide a fluid tight seal under relatively low line pressures as well as high pressures to prevent slight leakage when the pressure in one or both of the coupling elements is merely that of a relatively low hydrostatic head for example.

When it is desired to couple the members they are first brought into the relative position shown in Figure 1. In this position the air entrapped between the two coupling members is at a practically irreducible minimum because of the fact that the valve elements 48 and 146 are in full surface contact and the adjacent end surfaces of the sleeve valve 68 and the body member 120 inwardly of the O-ring 130 are similarly in full surface contact.

It is of particular importance that the parts reach the position shown in Figure 1 excluding substantially all entrapped air before the seals at the valve elements of either of the parts are broken.

It is a feature of the invention that the parts may be coupled in a variety of ways none of which require manual prepositioning of any of the parts. For example, if the socket member 30 is held against axial movement the parts may be coupled by simply inserting the plug member into the socket member. If the plug member 32 is held axially stationary the parts may be coupled by moving the socket member axially onto the plug member. Additionally the latch ring 98 may be held against axial movement and in this case the parts may be coupled by simply inserting the plug member 32 into the socket 30. Uncoupling of the parts may also be effected in several different ways. For example, if either the plug member or the socket member 30 is rigidly mounted against axial movement the parts may be uncoupled by a direct longitudinal pull on the other member after retracting the latch ring 98. On the other hand if the latch ring 98 is mounted against movement the parts may be uncoupled simply by withdrawing the plug member 32 from the socket member 30 by a direct longitudinal pull on the former.

Assuming that the socket 30 is held against axial movement and that the latch ring 98 and the plug member are freely axially movable, the plug and socket members may be coupled by moving the former to the right as viewed in Figure 1. The relatively fixed lip 124 pushes sleeve valve 68 rearwardly. Simultaneously the fixed valve element 48 holds the valve element 146 against longitudinal movement thus effectively moving the latter away from the sealing surface 134 and compressing the spring 158. It will be noted that when the seals on the respective valve elements are broken the seal is established at the O ring 130 so that leakage of fluid during coupling is positively prevented. As the plug 32 continues to be inserted into the socket 30 the end of the body member 120 on the plug 32 moves under the indentations 78 of the locking fingers 80 replacing the valve sleeve 68 as the internal support for the indentations. This movement continues until the notch 122 is brought into register with the indentations 78 at which time the indentations are cammed into the notch by the spring biased latch ring 98. When the indentations in the latching fingers 80 are received in the notch 122 the latch ring moves out to the limit position shown in Figure 2 at which time the annular ring 102 associated with the latch engages the latch fingers outwardly of the area beyond the indentations and thus firmly holds the locking fingers in latched position. When in this position the coupling members cannot be separated by internal forces without breakage of the parts. Further the parts cannot be separated by a direct longitudinal pull unless the latch ring 98 is retracted.

It is a feature of the invention that when the parts are in the latched position of Figure 2 a flow passage is formed which assures minimum flow restriction and thus minimizes the pressure drop through the coupling.

It will be noted that the latch ring 98 always occupies the same position with respect to the plug member when the parts are in fully coupled position. In practice this position is, as shown in Figure 2, so selected that the annular groove 121 is completely covered by the outer end of the latch ring. Accordingly the groove provides a reliable indication of the stage of coupling of the two parts. In cases where it is known that the coupling will be used only where sufficient light is available to permit visual inspection the groove may be replaced by a scribed or painted line or band which when hidden indicates complete coupling of the parts. The use of a groove as opposed to the band or scribed line permits the coupling to be checked by touch where sufficient light may not be available to permit visual inspection.

As suggested above the parts may be uncoupled in several ways. For example, if the socket member 30 is held against axial movement and the latch ring 98 is retracted or moved to the right as viewed in Figure 1 this action will align the shoulder 102 on the latch ring with the locking indentations 78 on the spring fingers and permit the latter to move out of the locking notch 122. Then because of the combined forces of springs 70 and 158 the plug member 32 will be ejected from the socket member 30 and the parts in the coupling members will resume the position shown in Figure 1.

It will be noted that the seals at the respective valves will be established during uncoupling movement before the seal at the O-ring 130 is broken. Accordingly there is no possibility of the loss of fluid during the uncoupling action.

The parts may also be uncoupled by pulling on the plug member 32 while holding the latch ring 98 against movement. While the latch ring may be held manually it also may conveniently be mounted with a suitable bracket for example in the wall of a building, the wall of a tank or the fire wall or instrument panel of an aircraft. If the latch ring 98 is so held the uncoupling action will be exactly the same as if the socket member 30 were held against axial movement and the latch ring retracted.

Because of the fact that the parts may be uncoupled by relatively retracting the latch ring 98 with respect to the socket member 30 the coupling disclosed in Figures 1 and 2, if modified in accordance with the showing of Figure 6, lends itself readily to remote operation. In this form of the invention a compound sealing construction 162 similar to that shown in Figure 4 is positioned in an outwardly opening annular groove 160 in the latch ring 98. The sealing structure 162 engages the inner cylindrical surface of a ring 164 attached as by screws 166 to the outer surface of the body member 34 of the socket 30. Outwardly of the sealing structure 162 the ring 164 is provided with an inwardly opening groove 168 in which a similar compound sealing structure is received which sealingly engages the cylindrical outer surface of the latch ring 98. The two sealing structures 162 and 168 thus provide an annular expansible sealed chamber 172 to which a pressure line 174 is connected. The pressure line 174 may be selectively connected to pressure or exhaust by any conventional means not shown which may be located at any convenient remote position. The application of pressure through the line 174 to the chamber 172 will retract the latch ring 98 to uncouple the parts.

Figure 7:
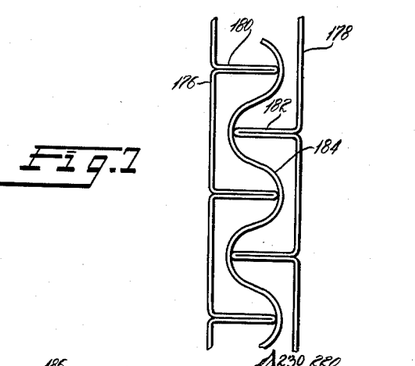
Figure 7 is an enlarged fragmentary plan view of a modified form of spring construction which may be incorporated in the coupling of Figure 1.

Figure 7 is an enlarged fragmentary developed view of a modified spring construction which may be used in the unit of Figures 1 and 2 for example, in lieu of the spring 106. The spring comprises a pair of identical sheet metal strips 176 and 178 having reversely folded integral portions 180 and 182 respectively which are normal to the plane of the main body of the strip. In assembly the strips 176 and 178 are disposed in the space between the outer surfaces of the spring fingers 80 and the inner surface of the latch ring 98 with the strip 178 being disposed against the end of sleeve portion 40 and the strip 176 being disposed against the opposed annular wall of the latch ring 98 and with the projecting portions 180 and 182 circumferentially off-set as shown in Figure 7. With the strips 176 and 178 so assembled one or more spring steel strips 184, which when relaxed are planar members, are bent and inserted between the projecting portions 180 and 182 of strips 176 and 178 to thereby yieldingly bias the strips 176 and 178 and the associated members apart. This type of spring has substantial advantages over the normal coil spring in that it provides better performance in an annular space which is of limited radial thickness relative to its diameter.

As is well known, the diameter of the coil spring wire must be at least equal to one-twentieth of the coil diameter. The spring of Figure 7 makes much higher ratios feasible.

Figure 8:
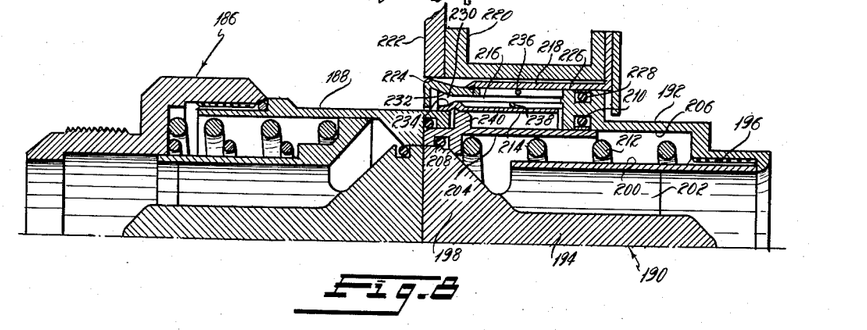
Figure 8 is a longitudinal half section of a modified coupling unit showing the plug and socket members in position for coupling.

Figure 8 illustrates a modified form of coupling which is essentially similar to the coupling of Figures 1 and 2 except that it incorporates a slightly modified latch mechanism which is effective to lock the parts in coupled relation in a number of positions rather than one position as is the case with the coupling of Figures 1 and 2. The latch mechanism of the type shown in Figure 8 may be used advantageously where it is desired to lock the elements in coupled relation at points where the valves in the couplings are disposed in intermediate positions between full open and full closed positions to provide any desired throttling or flow control action. In the coupling of Figure 8 the plug member indicated generally at 186 is preferably identical to the plug member 32 of Figures 1 and 2 except that the body sleeve extension 188 which corresponds to the member 120 of Figure 1 has a smooth cylindrical exterior surface omitting the locking notch 122 of the unit of Figure 1. The socket assembly indicated generally at 190 comprises an annular body member 192 into which a fixed valve seat element 194 is threaded as at 196. The fixed valve seat element 198, which is similar to the element 48 of Figure 1, is connected to a sleeve section 200 by means of a plurality, preferably four streamlined ribs 202, the spaces between the ribs forming the flow passage through the socket assembly. An annular valve sleeve member 204 is mounted for axial sliding movement within bore 206 of the body member 192 and carries an O-ring 208 to seal the periphery of the valve seat element 198 in a manner described in connection with Figure 5. A sealing construction 210 of the type shown in Figure 4 is provided between the sleeve valve and the body member 192. The sleeve valve is biased toward closed position as shown in Figure 8 by a coil spring 212.

The modified latching mechanism comprises a plurality of circumferentially spaced free floating spring latch fingers 214, a plurality of yielding spring fingers 216, rigid with and extending forwardly from the body member 192. In the embodiment shown in Figure 8 the latch sleeve 218 is mounted on a fitting 220 attached to the inner surface of the wall 222 of a tank or a similar fluid containing receptacle. The entire socket assembly is thus received within the circular opening 224 in the wall 222 of the tank and is located entirely within the tank. The socket assembly is mounted for sliding movement within the latch sleeve assembly 218 at the outer surface of the spring fingers 216 and on an outer cylindrical surface 226 of the body member 192. The latter surface is interrupted to provide an annular sealing structure 228 of the type shown in Figure 4. The outer ends of the spring fingers 216 are provided with V-shaped wedge sections 230 the outer surfaces of which are adapted to engage a similar inclined surface 232 adjacent the outer end of the latch sleeve 218, and the inner surfaces of which are adapted to wedgingly engage an inclined surface 234 formed by suitably bending the outer ends of the free floating latch fingers 214. Coil springs 236 and 238 are provided to bias the latch ring 218 and the spring fingers 214, respectively, into wedging contact with the wedge surfaces of the spring fingers 216, the limit position being shown in Figure 8. The latching fingers 214 are supported against inward radial movement by an annular projection 240 on the valve sleeve 204.

The plug assembly 186 may be coupled to the socket assembly 190 simply by forcing the former axially into the latter. The parts will be frictionally locked as soon as the outer surface of the body member 188 of the plug assembly 186 replaces the projection 240 as the inner support for the outer ends of the latch fingers 214. In Figure 8 the parts are shown coupled although the valve elements of both the plug and socket are fully closed. Further insertion of the plug assembly into the socket assembly will gradually open the valve elements in both the plug and socket members to form a flow passage of increasing size which reaches a maximum when the plug and socket members occupy the relative positions substantially as shown in Figure 2.

As the plug member is inserted into the socket the latch fingers 214 are displaced to the right as viewed in Figure 8 thus relieving the locking wedging action. However as soon as the plug member 186 is released the spring 238 biases the latching fingers 214 outwardly to restore the wedge lock to hold the parts firmly coupled. Conversely when the plug assembly is pulled to the left as viewed in Figure 8 both the plug and socket members move together within the latching sleeve 218 until the pressure developed between the surface 232 on the latch ring 218 and the adjacent surfaces of the spring fingers is released sufficiently to permit free separation of the parts.

Figure 9:
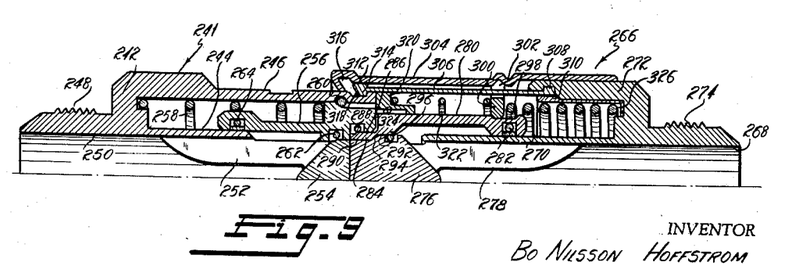
Figure 9 is a view similar to Figure 8 showing a further modification which is constructed to provide internal fluid pressure balance or any desired amount of bias.

Figure 9 discloses a further modification of the self-sealing couplings of the present invention which incorporates a unique construction by which the internal fluid forces are completely balanced so that only relatively light predetermined spring forces must be overcome to connect and disconnect the coupling and is thus especially adapted to permit the manual connection and disconnection of high pressure lines. It is a further feature of this form of coupling that the plug and socket members are locked together before the valve in either of the members is opened and the subsequent degree of opening of the valve member may be readily controlled to provide any desired throttling action.

Referring now in more detail to Figure 9 the plug assembly indicated at 241 comprises a main annular body member 242 having inner and outer concentric sleeve portions 244 and 246, respectively, and a threaded extension 248 for attachment to a fluid line fitting. Mounted within bore 250 of the body member 242 by means of spaced ribs 252 is a valve seat element 254. A sleeve valve element 256 is mounted for axial sliding movement in the annular space between the inner and outer sleeves 244 and 246 and is biased by a coil spring 258 to the limit position shown in Figure 9 determined by a stop ring 260 mounted in the outer sleeve 246. An O-ring 262 seals with a valve seat element 254 in the manner described in connection with Figure 5 above. An additional sealing construction 264 of the type shown in Figure 4 is provided to establish a sliding seal between the sleeve valve 256 and the inner body sleeve 244.

The socket assembly indicated generally at 266 includes a main body member having a central bore 268, inner and outer sleeve sections 270 and 272 and a threaded extension 274 for attachment to a fluid line fitting. A valve seat element 276 is mounted within the bore 268 by means of spaced ribs 278. A valve sleeve 280 is mounted for limited sliding movement on the outer surface of the sleeve portion 270. A seal between the sleeve valve 280 and the body sleeve portion 270 is provided by a low friction sealing construction 282 of the type shown in Figure 4. At its outer end valve sleeve 280 is provided with an annular lip 284 having a relieved outer cylindrical surface 286 adapted to establish a make and break seal with an O-ring 288 mounted in the plug valve sleeve 256, the seal at this point being of the type shown in Figure 5. The inner surface of the lip 284 is formed by concentric bores 290 and 292 connected by an inclined shoulder 294. The outer periphery of the forward portion of the valve seat member 276 is formed with similar surfaces. The valve sleeve 280 is shown in its limit position of movement to the right as viewed in Figure 9 in which the inner end of bore 292 is in annular sealing contact with an O-ring 296 mounted in a peripheral groove in the valve seat member 276, the seal being of the make and break type shown in Figure 5.

Mounted for limited sliding movement in an annular notch 298 on the valve sleeve 280 is a ring 300 having a plurality of spaced teeth 302 the outer ends of which are formed to lockingly fit within a mating formation on an annular latch ring 304 slidably mounted on the outer cylindrical surface of socket body portion 272. A plurality of circumferentially spaced spring latch fingers 306 extend through the spaces between the teeth 302 on the ring 300 and at their rearward ends are provided with integral enlarged sections 308 which are held in an annular groove in socket body portion 272 by an annular locking ring 310. At their outer or free ends the spring latch fingers 306 are provided with outwardly and inwardly extending projections 312 and 314, respectively, adapted to fit within an inwardly opening annular groove 316 formed on the outer end of the latch ring and an outwardly opening notch 318 formed on the outer surface of the sleeve section 246 of the plug body member. An annular latch finger support member 320 is mounted for sliding movement on the sleeve valve 280 and is urged to the left as viewed in Figure 9 by a coil spring 322 against a stop ring 324 mounted on the outer surface of the valve sleeve 280 when the parts are uncoupled. The socket assembly is completed by a coil spring 326 which positively biases the ring 300 and the associated latch ring 304 to the left as viewed in Figure 9 to the extent permitted by the limited movement of the annular ring 300 within the notch 298 in the valve sleeve 280.

The plug and socket members as shown in Figure 9 are positively latched together and the valve assemblies in both elements are fully closed so that while the parts are locked together there is no fluid flow through the coupling assembly. The opening action of the valve is controlled by springs 326 and 322 and 258, spring 326 exerting a force in a valve opening direction and the springs 258 and 322 exerting a balancing force in the valve closing direction. While if desired these springs may be substantially balanced, preferably the spring 326 is of sufficient strength with respect to springs 258 and 322 to open the valve assemblies within the coupling. If fluid under pressure is supplied to the socket member it does not exert either an opening or closing force on the valve assembly because of the fact that the seals 296 and 282 are of the same diameter. On the other hand if fluid under pressure is applied to the plug member before it is connected it will produce a closing force which is the function of the difference in diameter between the O-ring 262 and the seal point at the sealing construction 264. Once the valve assemblies are open the seal at the O-ring 262 will be broken and all internal fluid forces are thereafter balanced since the seals are established by the sealing constructions 264 and 282 on equal diameters. Accordingly the degree of opening of the valve members will be dependent upon the relative strength of the three springs involved, which can be predetermined to produce any desired result.

Since the degree of opening of the valve mechanisms is indicated directly by the position of the latch ring 304 which moves with the valve sleeves 280 and 256 the exterior of the plug member may be provided with suitable indicia from which the line pressure or the amount of opening of the valve mechanism may be read directly from the position of the latch sleeve 304.

Further it will be observed that an increase in diameter of the sleeve 244 accompanied by a corresponding increase in the diameter of the valve sleeve 256 and the associated sealing construction 264 will produce a bias in valve closing direction. Accordingly assuming no change in the construction of the socket or the strength of the three springs involved, a change in pressure in the plug and connected line can be effected by utilizing a plug having a sleeve 244 of different size.

If desired a series of graduated plugs may be provided and suitable marked to permit the establishment in the plug and connected line of any desired pressure. The construction is such that the plug pressure will be maintained constant regardless of change in the quantity of fluid flowing through the plug.

The coupling of Figure 9 may be coupled and uncoupled in exactly the same manner as the coupling of Figures 1 and 2. If the coupling body members for example are held against axial movement and the latch sleeve 304 is moved to the right as viewed in Figure 9 the latch spring fingers will move radially outwardly free of notch 318 when the recess 316 in the outer end of the latch ring 304 registers with the projection 312 on the spring latch fingers. The spring 322 will then slide the latch finger support member 320 under the projection 314 of the spring fingers when the parts are uncoupled to maintain the spring fingers in position for recoupling the parts merely by inserting the plug into the socket in the manner described above.

If the latch sleeve 304 is mounted on an appropriate support member in the manner shown for example in Figure 8 flow regulation may be effected by simply moving the coupling members axially with respect to the latch sleeve 304. It will be noted however that when the coupling members have been moved to the position shown in Figure 9 where flow is reduced to zero a substantially increased pull on the socket member will be required to uncouple the parts since in this position the force of relatively heavy spring 326 is no longer balanced by the force of spring 258. Accordingly the possibility of inadvertently uncoupling the members while moving them to shut off flow within the coupling is effectively minimized.

Figure 10:
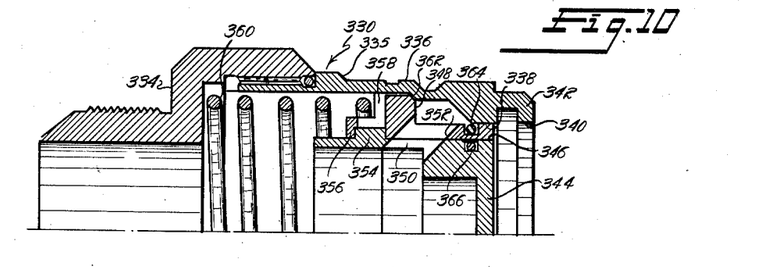
Figures 10 and 11 are longitudinal half sections of modified plug members which incorporate structure for preventing inadvertent displacement of the flow control valve by the application of external pressure.
Figure 11:
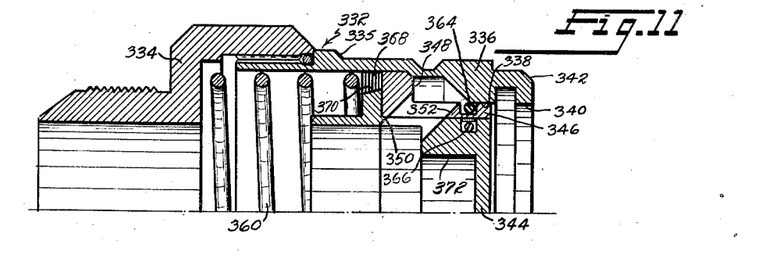

Figures 10 and 11 illustrate modified plug assemblies indicated generally at 330 and 332, respectively, which may be substituted for the plug assembly 32 of Figure 1 for use with the socket assembly 30 when it is desired to provide additional protection against opening displacement of the valve assembly under external pressure when the parts are uncoupled.

Referring first to Figure 10 the body members 334 and 335 of the plug assembly 330 are substantially identical to the corresponding elements 110 and 120 of Figure 1 except that the body member 336 is provided with a bore 338 which is substantially flush with the annular inner surface 340 of the lip 342. The valve assembly comprises an inner main valve body member 344 having an outer cylindrical surface 346 on which an auxiliary valve body member 348 is slidably mounted. The inner and outer valve elements are provided with registering passages 350 and 352, respectively, adapted to provide a flow passage through the plug when the valve elements are opened. The rear wall of the outer valve element 348 normally seats against the adjacent wall of an annular ring 354 formed on the outer periphery of the inner valve body element 344. An annular ring 356 which normally seats against the opposite radial wall of the projection 354 is provided with spaced L-shaped teeth 358 which extend across the peripheral surface of the projection 354 and extend radially outwardly along the rear wall of the outer valve member 348 into close clearance relation with the inner wall of the plug body member 336. Coil spring 360 is compressed between the radial wall of the body member 334 and the rearward surfaces of the teeth 358 to thereby resiliently bias the valve members 344 and 348 to the right as viewed in Figure 10 into closed position, the limit position being determined by contact of mating shoulders on the outer valve member 348 and the plug body member 336 at 362. When in this position the bore 338 of the body member 336 is in sealing contact with an O-ring 364 in the outer valve member 348 to establish a seal of the type discussed in connection with Figure 5. The adjacent surfaces of the inner and outer valve members are sealed by a sealing construction 366 of the type shown in Figure 4.

In use the plug member of Figure 10 may be connected and disconnected to the socket member such as the socket member 30 of Figure 1 in the same manner as the plug member 32 above described; it being understood that the inner diameter of the outer valve member 348 is smaller than the outer diameter of the valve member 48 of the socket so that the latter will displace both the inner and outer valve elements 344 and 348 to the left when the elements are coupled. If, when the parts are uncoupled, the valve member 344 is subjected to external mechanical pressure when accidentally struck or under similar circumstances it alone starts to move to the left as viewed in Figure 10. The resultant couple exerted on the ring 356 by the action of spring 360 and the inward movement of the valve body member 344 will cause the outer ends of teeth 358 to tilt slightly and bind against the inner surface of the plug body member 336 thus establishing an effective lock against further inward movement of the valve body member 344. While the same general effect might be obtained by utilizing a much stronger spring in lieu of the relatively light spring 360 such a spring would seriously interfere with the normal coupling of the parts.

The construction and function of the plug assembly 332 of Figure 11 is essentially the same as that of Figure 10. However instead of the ring 356 and the locking teeth 358 a plurality of wedge discs 368 are mounted between the cylindrical bore of the plug body member 336 and an outer inclined shoulder 370 on the inner valve body member 372. The wedging discs 368 are inoperative when the parts are coupled or uncoupled in the normal manner, that is, when both the inner and outer valve body elements 372 and 348 are displaced together but operate to lock the inner member against independent movement.

Figures 12 through 17 show modified forms of socket members adapted for special installations. Any of the socket members disclosed in Figures 12 through 17 may be used with any of the plug members above described and when so used afford substantially the same push-pull connecting and disconnecting action as that described in connection with Figures 1 and 2.

It is a feature of the socket assemblies of Figures 12, 14, 15 and 17 that they will automatically eject the plug member and close the valve assemblies when the pressure within the socket exceeds a predetermined value.

Figure 12:
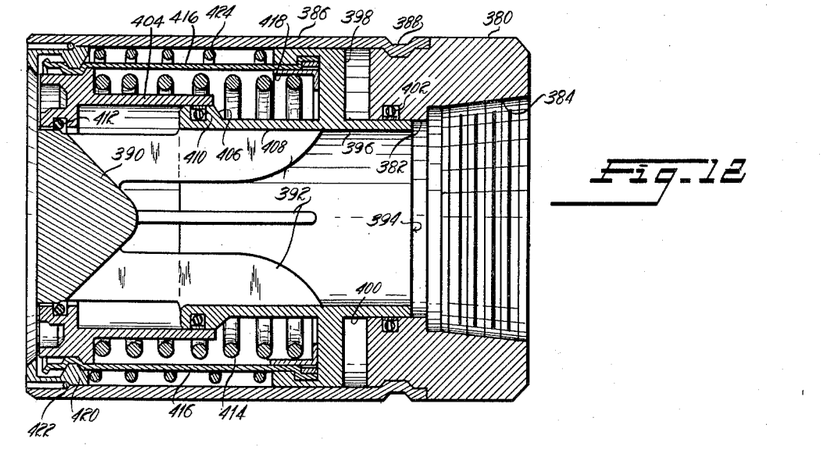
Figure 12 is a longitudinal section of a modified socket element particularly adapted for medium pressure installations.

The socket member shown in Figure 12 is particularly suited for installation on the end of a fixed pipe which handles medium pressure fluid. The socket assembly of Figure 12 comprises a relatively heavy annular fitting 380 having a cylindrical internal bore 382 and a tapered threaded section 384 for attachment to the end of a fixed pipe. An elongated cylindrical sleeve 386 is rigidly secured to the fitting 380 by crimping as at 388 and extends forwardly therefrom substantially enclosing the valve and latch mechanism of the socket. A valve seat member 390 and rib construction 392 preferably identical to the corresponding components of the socket 30 of Figure 1, are rigid with an annular member indicated generally at 394 which has an internal fluid passage 396 and an external annular L-shaped integral ring 398, the peripheral surface of which is slidably received within the sleeve 386. The cylindrical sleeve portion 400 projecting rearwardly from ring 398 is slidably received within bore 382 of fitting 380, the parts being sealed by a sealing construction 402 of the type shown in Figure 4. A valve sleeve 404, identical to the valve sleeve 68 of Figure 1, is mounted for axial sliding movement on the outer surface of a boss 406 adjacent the forward end of a sleeve portion 408 of the member 394. A seal is established between the member 394 and the sleeve valve 404 by a sealing construction 410 of the type shown in Figure 4. The valve sleeve 404 also carries an O-ring 412 which seals against the periphery of the valve seat element 390 in the manner described in connection with Figure 5 and is biased into sealing position by a coil spring 414. The spring latch fingers 416, identical to the corresponding elements of Figure 1, are immovably connected to the ring 398 by a locking ring 418. An outer latch ring member 420 is slidably mounted within sleeve 386 and is biased outwardly toward a stop ring 422 by a coil spring 424.

The plug member, for example the plug assembly 32 of Figure 1, may be latched to the socket assembly of Figure 12 by directly inserting the former into the latter. When initial contact is made between the parts all of the elements of Figure 12 with the exception of the fitting 380 and the sleeve 386 will be displaced to the right as viewed in Figure 12 to the limited extent permitted by the ring 398. Thereafter the latching components and the valve assemblies will be relatively moved in a manner described in connection with Figures 1 and 2. The parts may be uncoupled by a direct longitudinal pull on the plug assembly.

The member 394 and attached assemblies are biased to the right as viewed in Figure 12 by the spring 424 and are biased to the left by a force exerted by the line pressure acting on the area bounded by the seal assembly 402. Thus when the line pressure exceeds a predetermined value the assembly 394 will be moved to the left against spring 424 and the plug assembly will be uncoupled and ejected from the socket. Accordingly by selection of the diameter of seal 402 and the strength of spring 424 a safety shut off may be obtained at any desired line pressure.

Figure 13:
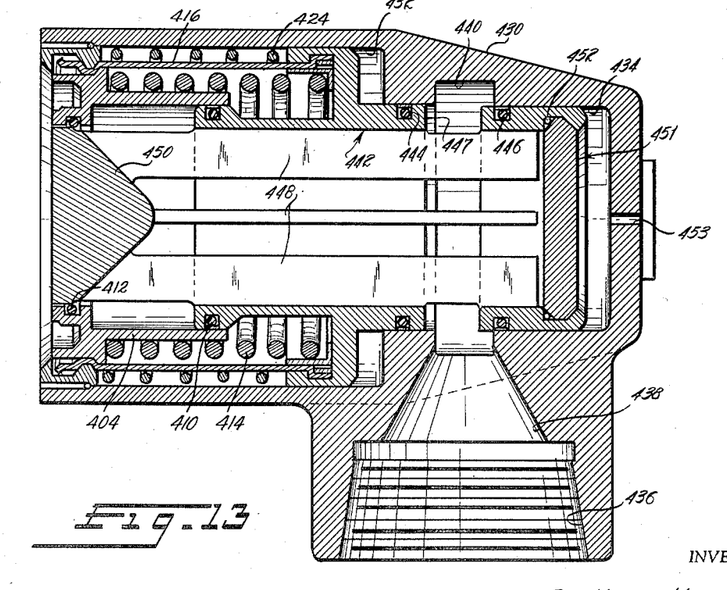
Figure 13 is a longitudinal section of a modified socket member which is fully balanced and adapted for high pressure installations.

The socket assembly of Figure 13 is also particularly adapted for attachment to a fixed pipe end and differs from the socket assembly of Figure 12 in that it is fully balanced and is thus particularly suited for handling fluids under high pressures. In the socket assembly of Figure 13, the fitting 380 and the sleeve 386 are replaced by an integral relatively heavy fitting 430 having internal stepped bores 432 and 434 which form an outlet section, and an inlet section comprising a tapered threaded section 436 for attachment to a fixed pipe end and a tapered fluid passage 438 connecting the section 436 to an annular enlargement 440 of the bore 434. Slidably received within the bore 434 is a main valve body element indicated generally at 442 provided with sealing constructions 444 and 446 of the type shown in Figure 4 at opposite sides of the inlet chamber 440. The member 442 has an annular opening 447 in alignment with the chamber 440 to place the interior of member 442 in fluid communication with the inlet 436. A series of ribs 448 rigid with the interior of the member 442 at their forward ends rigidly mount a valve seat assembly 450. The inner end of member 442 is crimped around a closure disc 451, the parts being sealed by an O-ring 452. The space behind the disc 451 is vented by an opening 453. The remaining components of the valve sleeve and latch mechanism are identical with the corresponding elements of Figure 12 and need not be further described in detail.

The latching and valve opening action of the socket assembly of Figure 13 is the same as that of Figure 12. However, since the internal fluid pressures are balanced the plug will not be ejected from the socket by high internal pressures.

Figures 14, 15:
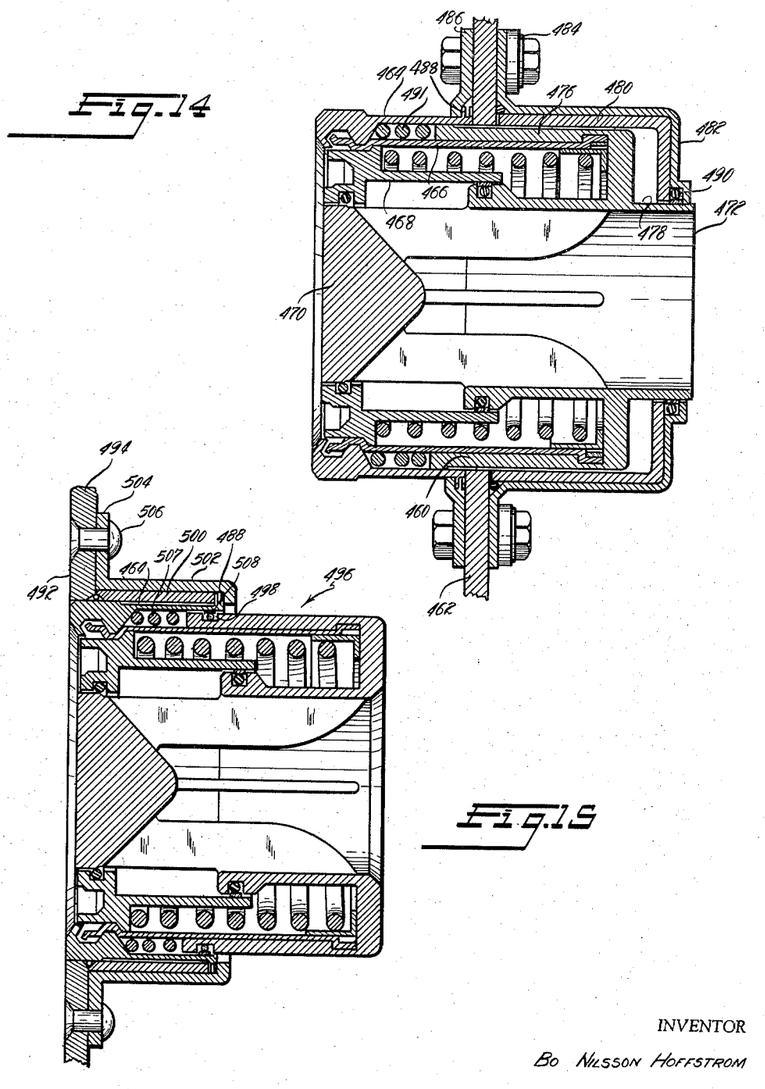
Figure 14 is a longitudinal section of a further modification of the socket member as installed in a fluid tank and adapted for medium pressure installations.
Figure 15 is a longitudinal section of a modified socket member installed flush with the outer surface of a tank or other wall member.

The socket assembly of Figure 14 is particularly adapted for installation in the opening 460 formed in the wall 462 of a tank, the interior of the tank being to the right as viewed in Figure 14. The latch ring assembly 464, spring latch fingers 466, valve sleeve 468, and valve closure member 470 are of the same construction as the corresponding components of the socket 30 of Figure 1. The main body member 472 of the socket is also of generally the same construction and configuration as the corresponding member of the unit of Figure 1 except that the concentric outer surfaces 476 and 478 are cylindrical. The portion of the body member 472 extending into the tank is enclosed by annular cover members 480 and 482, the latter being attached by means of bolts 484 to the wall 462 of the tank. The bolts 484 also serve to attach an annular clamp 486 which holds the flange 488 of the latch ring 464 firmly to the wall 462 of the tank. A sealing construction 490 of the type shown in Figure 4 is mounted between the inturned ends of the cover members 480 and 482. The coupling and uncoupling action and the valve action of the socket assembly of Figure 14 is the same as that of Figure 1 assuming the latch ring 98 of Figure 1 to be fixed against axial movement. The socket assembly will automatically eject the associated plug when the internal pressure exceeds a predetermined value which is determined by the strength of latch ring spring 491 and the area bounded by the O-ring 490.

Figure 15 illustrates the unit of Figure 14 modified to permit the socket assembly to be so mounted that its outer surface is flush with the outer surface 492 of the wall 494 of a tank. The structure and function of the socket assembly of Figure 15 is essentially the same as that of Figure 14. The body member 496 however is cut-off to eliminate the portion having the cylindrical surface 478 and is provided with an annular groove 498 to receive a sealing construction of the type shown in Figure 4 which sealingly engages the latch ring 464. The outwardly extending flange 488 of the latch ring 464 is clamped between the end of a sleeve member 500 and the inturned end of an attaching member 502, the latter having a flange 504 secured by rivets 506 or other suitable means to the wall 494 of the tank.

The socket assembly of Figure 15 will kickout the associated plug at a line pressure which is a function of the strength of latch sleeve spring 507 and the area bounded by the seal assembly 508.

Figure 16:
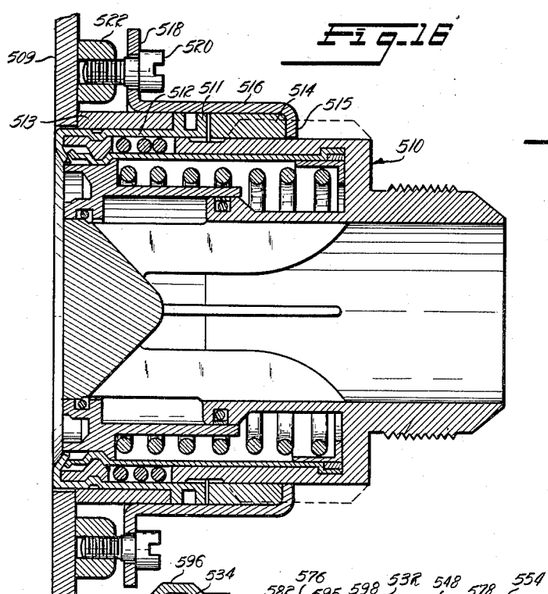
Figure 16 is a longitudinal section of a modified form of socket member mounted flush with a fire wall or similar member.

Figure 16 illustrates a further modification of the invention adapted for flush installation in a firewall or similar fixed structure 509. The socket assembly indicated generally at 510 is of the same construction as the socket assembly 30 of Figure 1. The flange 511 of the latch sleeve 512 is clamped between a collar 513 abutting the wall 509 and collar 514 having an internal hex surface. The collar 514 is held by the inturned lip 515 of an attaching bracket 516. The bracket 516 is provided with an outwardly extending flange 518 secured by bolts 520 to anchor nuts 522 riveted to the firewall 509. This mounting assembly effectively mounts the latch ring in fixed relation to the firewall 509 and the collar 514 locks the assembly against rotation.

Figure 17:
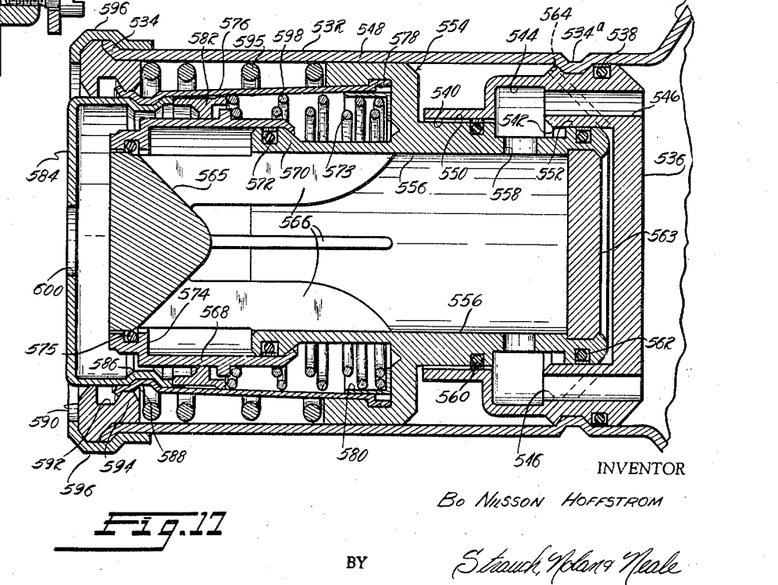
Figure 17 is a longitudinal section of a further modification of the socket member shown installed as a semi-permanent gas bottle cap.

Figure 17 illustrates a further modification of the socket assembly to adapt the unit for use in a semi-permanent gas bottle installation or equivalent installation.

In Figure 17 the gas bottle indicated at 530, has an integral substantially cylindrical neck portion 532 terminating in an outwardly flared lip 534. Adjacent its inner end the neck is crimped in as at 534a into a mating groove formed in the exterior of a fitting 536, the parts being sealed by an O-ring 538. The fitting 536 is provided with axially aligned relatively larger and smaller bores 540 and 542, respectively, separated by an inwardly opening annular recess 544 which is in fluid communication with the interior of the gas bottle 530 through a plurality of circumferentially spaced axially extending passages 546. Axially spaced cylindrical outer surfaces 548, 550 and 552 of the main socket body member 554 are slidably mounted respectively, in the neck of the bottle and in the bores 540 and 542 of the fitting 536. The fitting 536 is provided with an internal bore 556 which is in fluid communication with the recess 544 through a plurality of radial passages 558. Suitable sealing constructions 560 and 562 of the type shown in Figure 4 are provided to seal the members 554 and 536 at opposite sides of the recess 544. The bore 556 is closed at one end by a disc 563 the space behind the disc being vented by a bleed passage 564. A valve closure member 565 and a rib construction 566 of the type described above are formed integrally with the main socket member 554. A valve sleeve 568 is slidably mounted on a boss 570 on the main socket member 554 which carries a sealing assembly 572 of the type shown in Figure 4.

The valve sleeve is biased toward valve closed position by a coil spring 573 a shoulder 574 on the sleeve engaging the boss 570 when the sleeve is in valve closed position. A peripheral seal is provided between the valve seat member 565 and the valve sleeve 568 by an O-ring 575 which is arranged in the manner shown in Figure 5. A plurality of spring latch fingers 576 of the type described above are held in a recess 578 in the main body member 554 by a locking ring 580. The latch finger support member 582 is slidably mounted on the outer surface of the sleeve valve 568. It will be noted that the two parts 568 and 582, when properly aligned, have a configuration similar to the sleeve valve 68 of Figure 1.

As a safety feature a cover cap 584 encloses the open end of the plug assembly and is provided with a cylindrical projection interrupted by an annular indentation 586 of the same configuration as the indentation 588 on the spring latch fingers 576. An annular guard ring 590 having an annular recess 592 and an annular inwardly projecting rib 594 encircles the free ends of the spring latch fingers 576 and is mounted by an annular clamp member 596 on the free end of the neck 532 of the bottle 530. A relatively heavy coil spring 595 is compressed between the guard ring 590 and the body member 554 to bias the latter to the right as viewed in Figure 17.

Assuming the protective cover 584 to be removed, the latch finger support member 582 will be urged under the influence of a coil spring 598 outwardly into supporting relation with the under surface of the indentation 588 on the spring fingers. It will be understood that at this time the entire assembly is shifted slightly to the left so that the rib 594 is seated within the indentation 588 of the latch rings, so the latch mechanism generally occupies the position shown in Figure 1 of the drawings.

Any one of the plugs described above may then be inserted into the socket assembly with a latching and valve opening action which is the same as that described above in connection with Figures 1 and 2 for example.

Figures 18, 19:
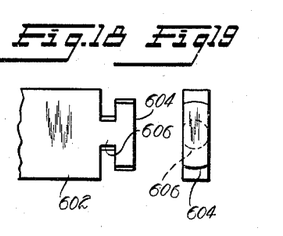
Figures 18 and 19 are side and end elevations, respectively, of a key member constructed for use with the socket assembly of Figure 17.

The plug may be removed by a direct longitudinal pull and the cover 584 may be replaced by simply pushing it into the socket member. However since the cover member 584 does not engage the valve sleeve 568 directly the socket valve will not be open when the cover is installed. The cover may be removed by a direct longitudinal pull. For this purpose the cover is provided with a narrow elongated slot 600 into which a key 602, shown in Figures 18 and 19 may be inserted. Key 602 has an operating portion 604 of slightly less thickness and length than the slot 600 connected to the body portion of the key by a neck 606 the maximum width or thickness of which is less than the thickness of the slot 600. Accordingly the key may be inserted into the slot 600 and when the operating portion 604 is entirely within the slot the key may be rotated 90° and the cover may then be pulled off. If desired a more complex key structure may be made to afford further protection to the socket assembly.

Since bore 540 is larger than the bore 542 the internal fluid pressure within the bottle will bias the main socket member 554 to the left as viewed in Figure 17 in opposition to coil spring 595. If the unbalanced fluid force thus established is sufficiently great to overcome the force of the spring 595 the resultant movement of the main body member 554 to the left will release the plug from the socket member. Accordingly by proper selection of the strength of spring 595 and the relationship of the diameters of the bores 540 and 542 the socket assembly may be set to kick out or automatically release the plug and close the socket valve at any preselected pressure within the gas bottle 530.

Figure 20:
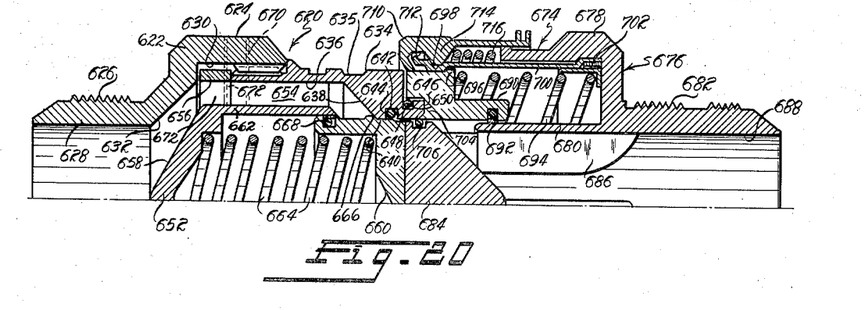
Figures 20 and 21 are longitudinal half sections of a further modification of the quick disconnect coupling unit of the present invention particularly adapted for underwater use or in other environmental conditions in which the external pressure is relatively high, Figure 20 showing the elements prior to coupling and Figure 21 showing the parts in latched relation.
Figure 21:
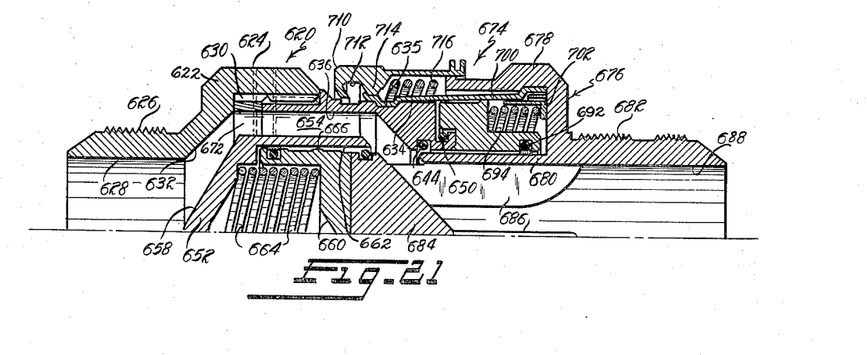

Figures 20 and 21, to which detailed reference will now be made, illustrate a further modification of the coupling of the present invention which is particularly adapted to perform effectively when the coupling is utilized in environments in which the external pressure exceeds the pressure of the fluid flowing through the coupling.

The plug and socket members are shown in Figure 20 in the position they occupy when they are brought into contact in coupling direction and before any of the parts have been relatively moved and Figure 21 shows the elements in fully coupled relation.

The plug assembly indicated generally at 620 comprises a hollow body member 622 having an external hexagonal surface 624 and a threaded cylindrical extension 626 for attachment to a standard fluid line fitting. The internal surface of the body member 622 is formed by cylindrical bores 628 and 630 connected by an inclined annular wall 632. The outer end of the bore 630 is threaded to receive the mating threads of an annular extension 634 having an annular latching groove 635. The extension 634 is provided with an internal bore 636 connected by an inclined shoulder 638 to a reduced bore 640 interrupted by a recess 642 to accommodate an O-ring 644. An annular projecting lip 646 having an outwardly opening recess 648 for an O-ring 650 is formed on the end of the extension 634. A generally cup-shaped inner body member indicated generally at 652 is provided with a series of externally projecting radial ribs 654 which extend into close clearance relation with the bore 636 in the body extension 634. Adjacent their rearward ends the ribs 654 are integrally connected to an outer ring 656 which is clamped between the end wall of bore 630 and the end of the body extension 634. Thus an annular fluid passage is formed through the plug by the bore 628, the passage defined by wall 632 and the corresponding inclined wall 658 on the member 652 and the passage between the radial ribs 654. When the parts are uncoupled this passage is closed by an annular valve member 660 slidably mounted within bore 640 of extension 634 and the inner major bore 662 of the member 652. A coil spring 664 urges the valve member 660 into a limit position in which an annular peripheral shoulder 666 contacts the inclined wall 638 of the body extension 634. In this position the outer relieved surface of the valve member establishes a make and break seal of the type shown in Figure 5. A sealing construction 668 of the type shown in Figure 4 is provided between the valve member 660 and the bore 662 of the member 652. One or more fluid passages 670 extend through the body member 622 into the bore 630 and thus communicate with the passages 672 formed in the ring 656 and the ribs 654 leading to the interior of the member 652 to thereby establish the same pressure on both sides of the valve member 660 when the parts are uncoupled.

The socket assembly indicated generally at 674 includes a body member 676 similar to the corresponding member of the socket assembly 30 of Figure 1 and includes inner and outer concentric sleeve sections 678 and 680, a threaded attaching section 682 and a valve seat member 684 positioned by internal ribs 686 within an internal cylindrical bore 688. A valve sleeve 690 is slidably mounted on the sleeve section 680 and the parts are sealed by a sealing construction 692 of the type shown in Figure 4. A coil spring 694 urges the valve sleeve 690 into the limit position shown in Figure 20 in which position the annular shoulder 696 on the valve sleeve engages the inner surface of the indentation 698 formed on each of a plurality of spring latch fingers 700 secured in place in the body member 674 by a locking ring 702. In this position annular lip 704 sealingly engages the mid-point of an O-ring 706 mounted in the periphery of the valve seat member 684 to provide a seal of generally the type discussed in connection with Figure 5. A relieved cylindrical wall engages the O-ring 650 on the plug member when the parts are brought into contacting relation as shown in Figure 20 to establish a seal at this point similar to the seal of Figure 5.

An annular latch ring 710 is slidably mounted on the exterior of the sleeve section 678 of the body member 676 and is provided with a recess 712 to receive the free ends of the latch fingers 700 and an inwardly projecting rib 714 of the same configuration as the indentation of the spring latch fingers. A coil spring 716 is provided to bias the latch ring to the left as viewed in Figure 20.

When the parts are uncoupled the valve member 660 on the plug assembly is urged toward closed position solely by the spring 664 because of the application of external pressure to the interior of the member 662. Similarly the valve sleeve 690 is urged toward closed position primarily by action of the spring 694, the external fluid pressure being applied equally to opposite sides of the valve sleeve 690. It will be noted that when the parts are uncoupled the seals formed by the O-rings 706 and 644 are effective only when the external pressure is higher than the pressure within the lines to which the plug and socket members are attached. The same is true of the seal formed by the O-ring 650 when the parts are fully coupled as shown in Figure 21. Sealing structures 668 and 692 are effective to prevent the flow of fluid in either direction past the seal point. The coupling and uncoupling action is exactly the same as that described in connection with Figures 1 and 2. However it is a feature of the unit of Figures 20 and 21 that the units may be coupled or uncoupled despite the presence of relatively high external pressures because of the balancing features incorporated into each of the plug and socket members.

As suggested above, the novel latching mechanism of the present invention may be applied with excellent results in installations where it is not necessary to provide internally valved couplings. Typical examples of such couplings omitting the internal valve mechanism are shown in Figures 22 and 23 to which detailed reference will now be made.

Figure 22:
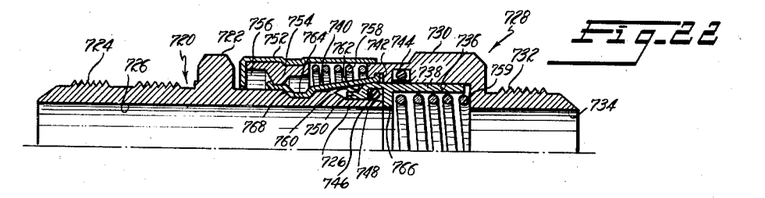
Figure 22 is a longitudinal half section showing a modified form of coupling for coupling fluid lines where it is not necessary to seal the lines when the coupling members are disconnected.

In the assembly of Figure 22 the plug assembly which is the standard male bulkhead end quick disconnect fitting now specified by the armed services comprises a single annular element 720 having an external hex surface 722, external threads 724 for attachment to a fluid line and a straight-through internal bore 726.

The socket assembly, indicated generally at 728, comprises a body member having an external hex portion 730, a threaded section 732 for attachment to a fluid line, and stepped internal bores 734 and 736. An internal guard sleeve 738 is mounted for sliding movement within bore 736 and serves to retain the spring latch fingers 740 in position in an annular recess 742 in the socket body member. A sealing construction 744, of the type shown in Figure 4, is provided to seal the adjacent surfaces of the socket body member and the guard sleeve 738. An O-ring 746 mounted in an inwardly facing groove 748 on the guard sleeve 738 sealingly engages the reduced and relieved outer surface 750 of the plug member 720 when the parts are in coupled relation as shown in Figure 22. A latch ring 752 having an annular rib 754 and an inwardly opening recess 756 of the same construction as the corresponding elements shown for example in Figure 1 is slidably mounted in the socket body member. The latch ring 752 is spring biased to the left as viewed in Figure 23 by a coil spring 758. When the parts are uncoupled the guard sleeve 738 is biased to the left by a coil spring 759, the cylindrical and inclined walls 760 and 762, respectively, contacting corresponding portions on the indentations 764 of the latch fingers 740. The latch sleeve 752 will be relatively retracted so that the rib 754 is received in the indentation 764. When the parts are coupled the plug member contacts an annular ridge 766 on the locking sleeve 738 to displace the latter inwardly. This movement is continued until the indentation 764 is in register with the locking groove 768 on the plug member at which time the latch fingers will be cammed inwardly into the locking groove and the latch sleeve will be spring biased to the position shown in Figure 22 thereby holding the parts in locked latched position. The parts may be uncoupled in the same manner as the coupling members of Figures 1 and 2 for example.

Figure 23:
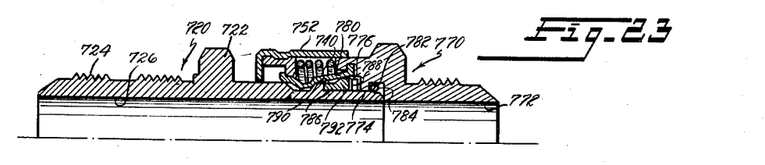
Figure 23 is a view similar to Figure 10 showing a modified form of valveless coupling.

A slightly modified and simplified form of valveless coupling is shown in Figure 23. The assembly there shown includes the plug member 720 described in connection with Figure 22. The latch ring 752 and the spring latch fingers 740 are also identical to corresponding components of Figure 22. However the interior of the socket body member 770 is of modified construction and is formed by successively enlarged stepped bores 772, 774, 776 and 780. The bore 774 forms a continuation of the bore 726 in the plug member and the bore 774 which is slightly larger than the cylindrical surface 750 on the plug member is interrupted by a recess 782 in which an O-ring 784 is positioned which forms a seal of the type discussed in Figure 5 with the plug member when the parts are fully coupled. An inner guard ring 786 of simplified construction is mounted for sliding movement in bore 776 and is urged to the left by spring 788. The guard ring 786 is provided with cylindrical and conical surfaces 790 and 792, respectively, adapted to engage and support similar surfaces on the indentation 764 of the locking finger 740 when the parts are uncoupled.

The coupling and uncoupling action of the assembly of Figure 23 is the same as that of the unit of Figure 22 or the assembly of Figures 1 and 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A coupling assembly comprising interfitting plug and socket members, a plurality of latching fingers mounted at one end on said socket member, the opposite ends of said fingers being radially movable, an annular support member mounted for axial sliding movement on said socket member within said fingers, means resiliently biasing said support member axially outwardly of said socket member toward a position for supporting said fingers in a first radial position, an annular latch ring slidably mounted on said socket member in encircling relation with said fingers and adapted to selectively retain said opposite ends of said latch fingers in said first radial position and a second radial position, means forming a latching surface on said plug member adapted to be engaged by said fingers when in said second radial position, and means forming cooperating mating surfaces on said plug member and said inner support member effective upon insertion of said plug member into said socket member to displace said support member to permit said latch fingers to move to said second radial position and thereby lock said plug to said socket.

2. A coupling assembly comprising interfitting plug and socket members, a plurality of latching fingers mounted at one end on said socket member, the opposite ends of said fingers being radially movable, a first valve seat member rigid with said socket member, an annular valve sleeve mounted for axial movement on said body within said fingers, means resiliently biasing said valve sleeve axially outwardly of said socket member, cooperating formations on said fingers and said valve sleeve for retaining said valve sleeve in a position for supporting the free ends of said fingers in a first radial position and for sealingly engaging said valve seat, an annular latch ring slidably mounted on said socket member in encircling relation with said fingers and adapted to selectively retain said opposite ends of said fingers in said first radial position and in a second radial position, means forming a latching surface on said plug member adapted to be engaged by said fingers when they are in said second radial position, a second fixed valve seat member rigid with said plug member, a valve element slidably mounted in said plug member, means yieldably biasing said valve element into sealing engagement with said second fixed valve seat member, means forming cooperating surfaces on said plug member and said annular valve sleeve effective upon insertion of said plug member into said socket member to displace said valve sleeve to permit said latch fingers to move to said second radial position and thereby lock said plug to said socket and to move said valve sleeve away from said valve seat member, and cooperating surfaces on said first valve seat member and said valve element effective upon insertion of said plug member into said socket member to move said valve element out of engagement with said second fixed valve seat member to thereby permit fluid flow through said coupling assembly.

3. A quick disconnect socket construction comprising a tubular socket member, an annular latch ring mounted for sliding movement axially of said socket member, a plurality of circumferentially spaced latch fingers positioned within said latch ring and adapted to grippingly engage a plug member, a plurality of circumferentially spaced spring fingers rigid with said socket member and positioned between said latch ring and said latch fingers, said spring fingers having inwardly and outwardly flared wedge surfaces adjacent the free ends thereof, means forming complementary wedge surfaces on said ring and said latch fingers adapted to engage the outwardly and inwardly flared wedge surfaces on said spring fingers, respectively, an annular support member mounted for sliding movement axially of said socket member within said latch fingers, and resilient means urging said latch fingers, said ring and said support member axially outwardly of said socket member into wedging engagement with said spring fingers.

4. A coupling for quickly connecting and disconnecting fluid lines comprising plug and socket members, valve assemblies in each of said members, means resiliently biasing said valve assemblies to closed position, latch fingers mounted on said socket and adapted to latchingly engage latching formations on said plug member, a latch ring slidably mounted on said socket and adapted to selectively retain said fingers in latching engagement with said plug and to release said fingers to permit disconnection of said plug and socket members, and means connecting said valve assemblies and said latch ring whereby the valve assemblies may be opened and closed by movement of said latch ring when said plug and socket members are coupled.

5. A coupling for quickly connecting and disconnecting fluid lines comprising plug and socket members, valve assemblies in each of said members, means resiliently biasing said valve assemblies to closed position, latch fingers mounted on said socket and adapted to latchingly engage latching surfaces on said plug member, a latch ring slidably mounted on said socket and adapted to selectively retain said fingers in latching engagement with said plug and to release said fingers to permit disconnection of said plug and socket members, and means forming an annular surface on the valve assembly in said socket member adapted to support the inner surfaces of said fingers when said plug and socket members are disconnected.

6. A quick disconnect plug assembly comprising an annular body member having an annular sealing surface adjacent one end, an annular closure member slidably mounted in said body member and carrying on its outer surface a sealing member adapted to sealingly engage said sealing surface and having a through bore, a second closure member slidably received within said through bore and carrying a sealing member adapted to sealingly engage the surface of said bore, and means carried by said second closure member and engageable with said body member for preventing relative axial movement of said second closure member with respect to said first closure member while permitting said first and second closure members to move freely together axially of said body member.

7. A quick disconnect socket assembly comprising an annular body member adapted for attachment to a fluid line and having an annular sleeve portion, a valve seat assembly including a valve seat mounted for axial sliding movement in said body member, a plurality of latching fingers mounted at one end in said valve seat assembly, the free ends of said fingers having latching formations adapted to engage corresponding formations in a plug member when in a first radial position and to clear said corresponding formations when in a second radial position, an annular valve sleeve having an outer surface adapted to support said free ends of said fingers in said second radial position and an inner surface adapted to sealingly engage said valve seat and adapted to be moved away from supporting relation by a mating plug member, a latch ring slidably mounted in said sleeve portion of said body in encircling relation with the free ends of said fingers and adapted to support said fingers in said first and second radial positions when said ring and said fingers are in first and second relative axial positions, respectively, and means responsive to a predetermined internal pressure within said socket assembly to move said valve seat assembly and said fingers with respect to said ring to dispose said ring and said fingers in said second relative axial position to thereby automatically permit said fingers to move to said second radial position to release said mating plug member.

8. A quick disconnect socket assembly comprising a socket body member, a plurality of latching fingers mounted at one end on said body member, latch ring means mounted on said socket body member for sliding movement axially of said body member for supporting the free opposite ends of the fingers against outward radial movement, and separate means mounted on said socket body member for sliding movement axially of said body member for supporting said free opposite ends of said fingers against inward radial movement.

9. A quick disconnect socket construction comprising a tubular socket member, an annular latch ring mounted on said socket member for movement axially thereof between advance and retract positions, a plurality of latch fingers mounted at one end on said socket member and extending axially away from said socket member inwardly of said latch ring, the free ends of said fingers being radially movable, latching formations adjacent said free ends of said latch fingers adapted to engage corresponding surfaces on a plug member when in a first radial position and to clear said corresponding surfaces when in a second radial position, cooperating means on said latch ring and latch fingers operable to maintain said latching formations in said first radial position only when said latch ring occupies said advance position, said fingers being freely movable toward said second radial position when said latch ring occupies said retract position, an annular support member mounted on said socket for movement axially thereof to limit the inward displacement of said free ends of said latch fingers when said plug is removed from said socket, means biasing said support member outwardly of said socket, and cooperating formations on said fingers and said support member for limiting the outward movement of said support member.

10. A quick disconnect socket construction comprising a tubular socket member, a fixed valve seat in said socket member, an annular latch ring mounted on said socket member for sliding movement axially of said socket member, a plurality of circumferentially spaced latch fingers positioned within said latch ring and adapted to grippingly engage a plug member, said latch ring being effective to limit outward radial movement of said latch fingers, means for transmitting to said socket member axial forces imposed on said latch fingers, an annular valve closure element mounted on said socket member for sliding movement axially of said socket member within said latch fingers and in encircling relation with said valve seat into and out of sealing engagement with said valve seat, means urging said valve closure element axially outward of said socket into supporting relation with said latch fingers and into sealing engagement with said valve seat, and cooperating means on said latch fingers and said valve closure element for limiting the axial movement of said valve closure element.

11. A coupling assembly comprising interfitting plug and socket members, a plurality of latching fingers mounted at one end on said socket member, the opposite ends of said fingers being radially movable, a first valve seat member rigid with said socket member, an annular valve closure member mounted for axial movement on said socket member within said fingers, means resiliently biasing said valve closure member axially outwardly of said socket member toward a position for supporting the free ends of said fingers in a first radial position and for sealingly engaging said valve seat member, an annular latch sleeve slidably mounted on said socket assembly in encircling relation with said fingers and adapted to selectively retain said opposite ends of said fingers in said first radial position and in a second radial position, means forming a latching surface on said plug member adapted to be engaged by said fingers when they are in said second radial position, a second valve seat member rigid with said plug member, a second valve closure element slidably mounted in said plug member, means yieldably biasing said second valve closure element into sealing engagement with said second valve seat member, cooperating means on said annular valve closure member and said second valve seat member for establishing an annular fluid-tight seal between said plug and socket members when said members are moved toward coupled position and before the valves are opened, said valve members having mating surfaces in full surface contact over substantially the entire area bounded by said annular fluid tight seal as said couplings are moved toward coupled position before said valves are opened to thereby substantially eliminate the inclusion of air when said members are coupled, and means forming cooperating surfaces on said plug member and said annular valve closure member effective upon insertion of said plug member into said socket member after said annular fluid tight seal is established to displace said annular valve closure member away from supporting relation with said latch fingers to permit said latch fingers to move to said second radial position and thereby lock said plug member to said socket member.

12. A coupling for connecting and disconnecting fluid lines comprising interfitting plug and socket assemblies, a fixed valve seat member in said socket assembly, an annular valve sleeve mounted on said socket assembly for movement axially of said socket assembly, an O-ring mounted in an annular inwardly facing recess in said valve sleeve, means biasing said valve sleeve toward a limit position to dispose said O-ring in sealing engagement with an annular surface of said valve seat member, the upstream edge of said annular surface being relieved adjacent a plane substantially bisecting said O-ring when the latter occupies its limit position, a second fixed valve seat member in said plug assembly, a valve closure member mounted on said plug assembly for movement axially of said plug assembly, an O-ring mounted in an annular outwardly facing recess in said valve closure member, means biasing said valve closure member toward a limit position to dispose said O-ring in sealing engagement with an annular surface on said second fixed valve seat member, the upstream edge of said surface being relieved adjacent a plane substantially bisecting said O-ring when the latter occupies its limit position, and cooperating means on said plug and socket assemblies for moving each of said O-rings away from the adjacent sealing surface in an upstream direction when said plug and socket members are moved into coupled relation.

13. A coupling assembly comprising interfitting plug and socket assemblies, a plurality of latching fingers mounted on said socket assembly, the outer ends of said fingers being radially movable, an annular support member mounted for axial sliding movement on said socket assembly within said fingers, means resiliently biasing said support member axially outwardly of said socket assembly toward a position for supporting said fingers in a first radial position, an annular latch ring slidably mounted on said socket member in encircling relation with said fingers and adapted to bias said outer ends of said latch fingers toward a second radial position, means forming a latching surface on said plug assembly adapted to be engaged by said outer ends of said fingers when said fingers are in said second radial position, and means forming cooperating mating surfaces on said plug assembly and said inner support member effective upon insertion of said plug assembly into said socket assembly to displace said support member axially inwardly to permit the outer ends of said latch fingers to move to said second radial position under the influence of said latch ring to thereby lock said plug assembly to said socket assembly.

14. A coupling assembly comprising interfitting plug and socket members, a plurality of latching fingers mounted on said socket member, the outer ends of said fingers being radially movable, a first valve seat member rigid with said socket member, an annular valve sleeve mounted for axial movement on said body within said fingers, said valve sleeve having an inwardly opening annular recess, an annular resilient seal member in said recess, means resiliently biasing said valve sleeve axially outwardly of said socket member, cooperating formations on said fingers and said valve sleeve for retaining said valve sleeve in a limit position and for supporting the free ends of said fingers in a first radial position, said first valve seat member having an annular surface adapted to be sealingly engaged by said resilient seal member only when said valve sleeve is closely adjacent said limit position, an annular latch ring slidably mounted on said socket member in encircling relation with said fingers and adapted to selectively retain the opposite ends of said fingers in said first radial position and in a second radial position, means forming a latching surface on said plug member adapted to be engaged by said fingers when they are in said second radial position, a second fixed valve seat member rigid with said plug member, a valve element slidably mounted in said plug member, said valve element having an outwardly open annular recess, an annular resilient seal member in said recess, means yieldably biasing said valve element toward a limit position, said valve seat member having a surface adapted to be sealingly engaged by said resilient seal member only when said valve element is closely adjacent said limit position, means forming cooperating surfaces on said plug member and said annular valve sleeve effective upon insertion of said plug member into said socket member to displace said valve sleeve to permit said latch fingers to move to said second radial position and thereby lock said plug to said socket and to move said valve sleeve away from said first valve seat member, and cooperating surfaces on said first valve seat member and said valve element effective upon insertion of said plug member into said socket member to move said valve element out of engagement with said second fixed valve seat member to thereby permit fluid flow through said coupling assembly.

15. A coupling assembly according to claim 11 wherein the cooperating sealing means on said annular valve closure member and said second valve seat member comprise an inwardly facing annular groove on said second valve seat member, an annular resilient seal element into said groove, and means forming an annular surface on said annular valve closure member adapted to be sealingly engaged by said seal element, said surface being relieved adjacent a plane substantially bisecting said seal element when the latter is in sealing position.

16. A quick disconnect socket assembly comprising a socket body member, a plurality of latching fingers mounted at one end on said body member, the free ends of said fingers being radially movable, a latching ring mounted on said body member for sliding movement axially of said body member for supporting the free ends of the fingers against outward radial movement, means resiliently biasing said latching ring axially outwardly, cooperating means on said latching ring and said fingers for limiting the axial movement of said latching ring, an annular support member mounted within said fingers on said body for sliding movement axially of said body member for supporting the free ends of said fingers against inward radial movement, means resiliently biasing said annular support member axially into supporting position, and cooperating means on said annular support member and said fingers for limiting the axial movement of said annular support member.

References Cited in the file of this patent

UNITED STATES PATENTS

| | | |
|---|---|---|
| 1,118,876 | Newton | Nov. 24, 1914 |
| 1,711,870 | Zerk | Mar. 7, 1929 |
| 2,304,390 | Wolfram | Dec. 8, 1942 |
| 2,441,363 | Krueger | May 11, 1948 |
| 2,453,741 | Bopp | Nov. 16, 1948 |
| 2,545,796 | Scheiwer | Mar. 20, 1951 |
| 2,674,469 | Earle et al. | Apr. 6, 1954 |
| 2,678,834 | Courtot | May 18, 1954 |
| 2,704,650 | Rand | Mar. 22, 1955 |
| 2,727,759 | Elliott | Dec. 20, 1955 |
| 2,784,987 | Corcoran | Mar. 12, 1957 |
| 2,789,838 | Palm | Apr. 23, 1957 |